Patented Sept. 25, 1945

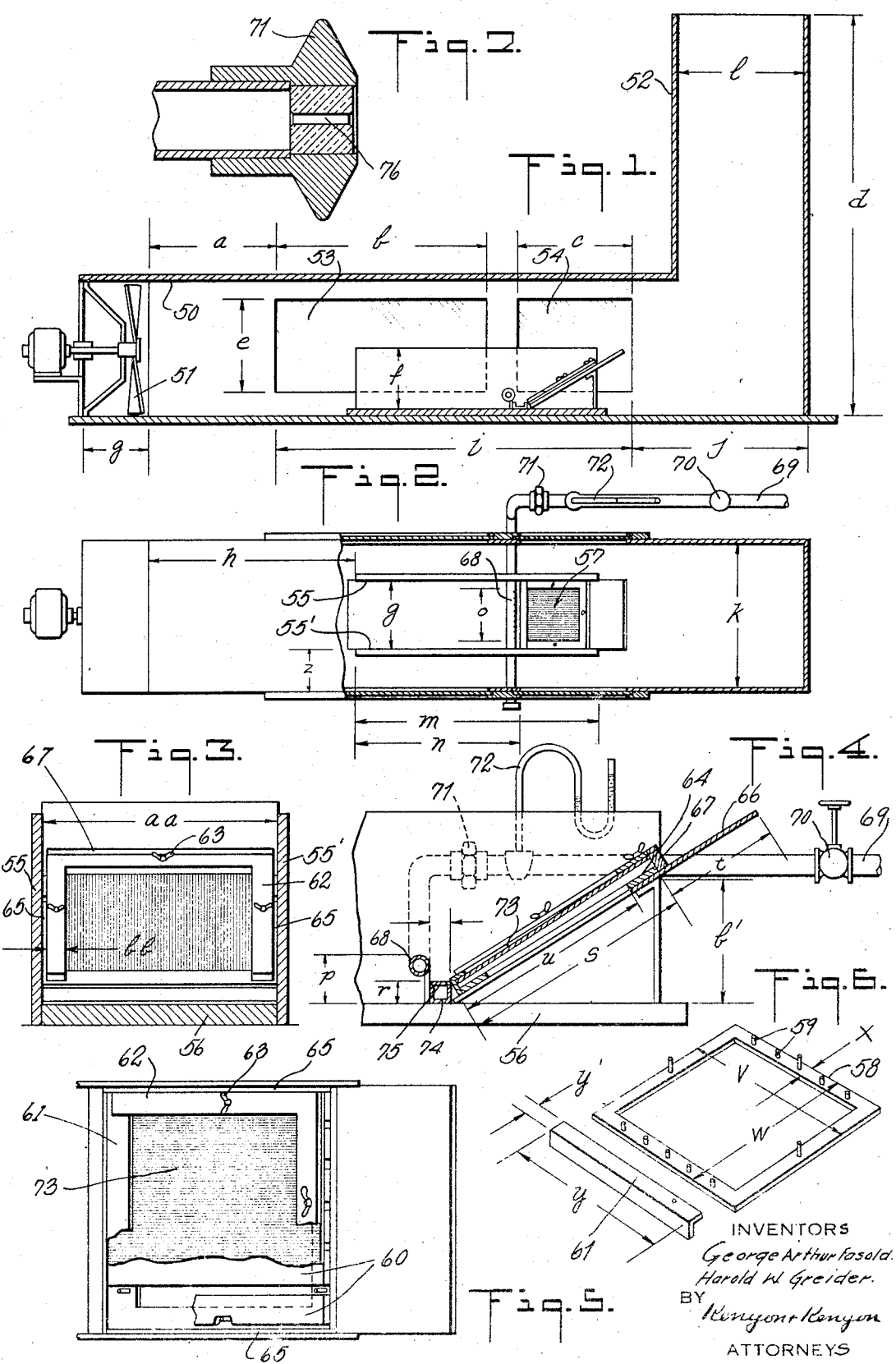

2,385,437

UNITED STATES PATENT OFFICE 2,385,437

BITUMINOUS PAINT

George Arthur Fasold, Mount Healthy, and Harold W. Greider, Wyoming, Ohio, assignors to The Philip Carey Manufacturing Company, a corporation of Ohio Application August 7, 1943, Serial No. 497,800

7 Claims. (Cl. 106—282)

This invention relates to bituminous paint compositions. It relates especially to bituminous paint compositions which contain a volatile solvent for maintaining the paint compositions of fluid consistency prior to application as a coating.

It is an object of this invention to provide a bituminous paint composition which, after application to a surface and evaporation of the volatile solvent, provides a highly fire-resistant protective coating.

Bituminous paint compositions are used for a wide variety of purposes in providing protective coatings, particularly where resistance to moisture and to weathering is desired. Such paints are frequently applied to the surface of roofings, particularly built-up roofings, as a finishing coat or for resurfacing a roofing that has been subjected to prolonged exposure to the weather and commonly are used as a coating for siding and for asphalt ply boards. Such paints are also frequently applied to other bases including metal, concrete and other masonry material as a protection and for other purposes. Such bituminous paints are extensively used on metal, especially to prevent the rusting of iron. Conventional bituminous paints of the type in question consist predominantly of a suitable asphalt or other bitumen that is solid or at least semisolid at a normal atmospheric temperature, together with a solvent for liquefying the bitumen and sometimes with a minor amount of filler such as limestone dust or slate flour. Such bituminous paints frequently contain fibrous filler, either organic or mineral, in amounts such as 5 to 15% by weight of the solid content of the paint and of substantial length e. g., ⅛ inch or longer. Such paints are, however, readily combustible when exposed to flame and are particularly deficient in retarding spread of flame. Moreover, if such prior paints contain fiber, the fiber tends to accumulate in clots which are dragged along on the surface to which the paint is applied, leaving areas insufficiently coated and undesirable clumps of fiber at other places.

It is a feature of this invention that there is combined with a bitumen that is solid or semisolid at normal atmospheric temperatures, finely-divided solid water-insoluble heat-resistant mineral filler which constitutes at least 55% by weight of the non-volatile constituents of the paint composition. It is a further feature of this invention that a substantial proportion of the paint composition consists of mineral fiber, preferably asbestos fiber, that is of selected grading and amount and that is relatively more finely-divided than the asbestos which is ordinarily produced and sold as "fiber." We have found that when the asbestos fiber of the proper amount and grading is employed and is employed in proper relation to the remaining ingredients of the composition, there is a limited zone wherein very high fire resistance is attained while at the same time providing a paint composition of good application characteristics and, when dried, of good finish, uniformity of composition, and high weather resistance.

It is a feature of bituminous paint compositions embodying this invention that, upon application and evaporation of the volatile solvent, the resulting coating contains a skeletal mat-like mass of mineral which not only is of very low combustibility but also is effective in preventing flow of the bitumen when heated and of retarding flame spread. Bituminous paint compositions of the type heretofore made and sold, when exposed to flame, not only burn freely but also tend to melt and flow. The flowing is objectionable both because it tends to carry the flame and because it carries away the paint coating, leaving the underlying surface unprotected. Moreover, bituminous paint compositions of the type heretofore made and sold have little resistance to travel of flame along the painted surface, particularly when under the influence of a draft of air. Fire hazard due to poor fire resistance of bituminous paint compositions has been minimized according to the invention of the present application. As distinguished from the behavoir of prior art bituminous paint compositions, the dried coating resulting from the bituminous paint composition of the present invention upon exposure to flame remains in place without spread of flame and becomes carbonized to form a coherent continuous mat-like residue which has high heat insulating characteristics and which protects the underlying surface from the heat of the flame.

A typical example of a bituminous paint composition prepared in accordance with this invention is given below. In this example and elsewhere herein the percentages given are percentages by weight. In the following example the screen grading of asbestos dust passing a 6 mesh standard testing sieve and retained on an 8 mesh standard testing sieve is indicated for purposes of brevity as (—6+8). Other screen gradings are indicated similarly. By "paint base" in the following example and elsewhere, reference is made to the non-volatile constituents of the paint composition.

Example 1

Paint base

| | Per cent |
|---|---|
| Asphalt (220° F. softening point) | 35 |
| Asbestos dust gradings: | |
| −6+8 | .1 |
| −8+10 | .4 |
| −10+14 | 2.5 |
| −14+20 | 4.5 |
| −20+28 | 3.0 |
| −28+35 | 4.5 |
| −35+48 | 1.0 |
| −48+65 | 1.0 |
| −65+100 | 1.0 |
| −100+150 | 3.0 |
| −150+200 | 4.0 |
| −200 | 10.0 |
| Total asbestos dust | 35 |
| Kaolinitic clay (mostly −200) | 30 |

The paint base of the foregoing example is mixed with volatile solvent to the desired application consistency. For example, the paint composition may be made up using in the neighborhood of about 60% of the paint base and about 40% of a solvent. Any suitable solvent may be used such as petroleum naphtha, hydrogenated naphtha, benzol, creosote oil, turpentine, dipentene and the like or suitable mixtures of any of these solvents. Preferably the amount of solvent used runs from about 30% to 60% of the paint composition, although there is considerable latitude in this regard and the solvent may be varied over an even wider range such as 25% to 65%. It is usually desirable, however, not to employ more than 60% of volatile solvent. If desired, various viscosity reducers and stabilizers may be used such as cumarone resin, indene resin, rosin esters and the like, especially when the proportion of volatile solvent in the paint composition is relatively low.

When a bituminous paint composition is prepared in the manner above described, and is applied and permitted to dry, the resulting paint coating has very high resistance to fire. The desirability of high fire resistance is self evident and for many years efforts have been made to produce paint compositions having high fire resistance as a property.

We have constructed built-up roofing comprising asbestos felt, the upper surface of which roofing has had applied thereto a preferred embodiment of the special paint composition of this invention, and which roofing carrying such coating meets the Class "A" fire retardant tests prescribed by Underwriters' Laboratories, Inc. of Chicago, Ill. Other embodiments of the paint composition of this invention similarly used meet the requirements of the Class "B" fire retardant tests of Underwriters' Laboratories Inc. Ordinary bituminous paints heretofore commercially manufactured have poor fire resistance, the resistance to spread of flame being especially low. We do not know of any bituminous paint, that, when similarly applied to the surface of a built-up roofing, will, regardless of the character or fire resistance of the built-up roofing construction to which the paint composition is applied will meet the requirements of either the Class "A" or the Class "B" fire retardant tests prescribed by Underwriters' Laboratories, Inc.

The high fire resistance characteristics of bituminous paint compositions made according to this invention are due to a combination of factors. One of these factors is that the asbestos fiber of the screen gradings mentioned has the property of effecting a very pronounced stabilization of bitumen even when the bitumen is subjected to temperatures at or approaching flame temperatures at which the bitumen normally would be reduced to a highly liquid state. In other words, the mineral fiber of the proper screen grading and amount has the property of greatly reducing the tendency of the bituminous paint base to flow when the paint base is exposed to flame temperature and causes the paint base to remain in place by the provision within the paint base of a stable skeletal mat. Another factor that is instrumental in achieving the high fire resistance of the bituminous paint composition is that there is contained in the paint composition a high proportion of mineral filler passing a 100 mesh testing sieve. In the composition of the foregoing example this very finely-divided mineral is provided both by the kaolinitic clay and by the finer gradings of asbestos fiber which pass a 100 mesh testing sieve. This finely-divided mineral serves two purposes from the point of view of fire resistance. In the first place it acts as a diluent which decreases the proportion of the bitumen to the asbestos fiber gradings that have a high stabilizing effect, the ratio of the asbestos of suitable grading to the bitumen in the paint base being a matter of considerable importance in effecting a high degree of resistance to fire. It may also be mentioned that the finely-divided mineral in the composition imparts to the paint composition desirable spreading characteristics when the paint composition is applied with a brush, so that the composition applies uniformly, easily and with good appearance.

The asphalt in the composition, while in itself combustible, actually serves to augment the fire retardant properties of the paint composition, for the mineral filler of the kinds and amounts specified renders the bitumen very resistant to combustion and flame spread and the bitumen, upon being exposed to flame temperature, tends to form a cementitious carbonized residue that bonds the mineral filler into a coherent mat-like mass that is of high heat insulating effectiveness and that protects the surface to which it is adherent from the heat of the flame and prevents the mineral filler from becoming readily displaced so as to leave the underlying surface unprotected. As aforesaid, during the initial stages of exposure to flame temperature the bitumen in the paint base is prevented from flowing by the skeletal mat of special mineral filler so that the underlying surface is protected at all times due to the fact that the protective mat of coherent residual material remains in place.

We have found that the paint base of a bituminous paint composition, namely, the non-volatile constituents of such a paint composition, can be stabilized by finely-divided solid water-insoluble, heat-resistant mineral filler contained therein provided the filler material contains filler that has a high flow resistance coefficient. The flow resistance coefficient of a filler is a measurable property that can be ascertained according to the test procedure that we have described below. The flow resistance coefficient of a filler material when mixed with a particular bitumen is peculiar in that for certain amounts and even certain very substantial amounts of filler the flow resistance coefficient will remain low and the bituminous composition will run and flow when exposed to flame temperature. However, there is a point where a particular filler material upon very small further increase in proportion to the bitumen effects a very great increase in the flow resistance coefficient. Mineral fiber and particularly asbestiform mineral fiber of a certain range of fine size grading, has to an extremely high degree the property of achieving high resistance to flow of bitumen with which it is mixed when the mixture is exposed to flame temperature. However, mineral fiber, including asbestiform mineral fiber, likewise has the above mentioned property of not effecting substantial stabilizing effect unless employed in an amount which, relatively to the amount of bitumen, is at or beyond the critical amount whereat very great increase in flow resistance is achieved. Moreover, different screen gradings of mineral fibers differ very greatly from each other in their effectiveness in imparting flow resistance characteristics to bituminous compositions.

In order to determine the flow resistance of a filler or filler mixtures in the paint base of a bituminous paint composition under conditions of actual exposure of the paint base to fire, we have devised a test whereby the flow resistance of the filler or filler mixture may be measured and expressed in terms of flow resistance coefficient. The test consists in applying the paint base of a bituminous paint composition to suitable sheet material, placing a representative sample on an inclined test deck, and directing a flame against the surface of the sample under precisely controlled conditions determined by the construction and operation of the testing apparatus.

The sample to be tested is prepared by applying the paint base, namely, the non-volatile constituents of the paint composition, to a sheet of asbestos felt which weighs, dry, about 10 pounds per 100 square feet and which is saturated to the extent of about 45% on the weight of the fiber with asphalt having a softening point of about 120° F. to 130° F. The unsaturated asbestos felt is the usual type used for built-up roofing and contains at least 85% of asbestos fiber of proper grade, together with some binder material such as starch, hair or the like. The bituminous paint base is applied so that the thickness will correspond to about 30 pounds, plus or minus 2 pounds, of coating per 100 square feet. The paint base can be applied either in a heat liquefied condition so as to avoid the trouble of causing the volatile solvent to evaporate, or as liquefied by a volatile solvent which is permitted to completely evaporate before the test is made. The following is a description of the testing of the sample, reference being made to Figs. 1 to 7 of the drawing.

The test is made in a wind tunnel 50 having a fan 51 at one end and a stack 52 at the other end. The tunnel is made of ¼ inch thick asbestos-cement lumber and has two windows 53 and 54 therein which can be opened and closed by any suitable means (not shown).

Within the tunnel are the burner and testing deck which are located between two shields 55 and 55¹ of the asbestos-cement lumber spaced 12¼ inches apart, and which are rigidly mounted on the asbestos-cement slab 56. The inclined test deck is indicated generally by the reference character 57 and comprises a lower frame-like member 58 having ¼ inch pegs 59 projecting from the face adjacent the upper and lower margins. Between the pegs, strips 60 of asbestos-cement boards 1¾ x 12 x ¼ inches are placed. One ply 12 x 12 inches of the prepared coated sample 73 to be tested is placed on the asbestos-cement boards 60 followed by an L-shaped guard plate 61 which guards the bottom edge of the sample. The assembly is held down by an iron frame 62 and held in place by thumb screws 63.

After the test deck has been assembled, it is placed on the inclined support 64 which has an opening in the back underneath the strips 60 and which has side flanges 65 to protect each side of the test panel. The support 64 comprises a baffle 66 to prevent the flame licking around behind the test deck. The support, which is made of iron, is mounted on the asbestos cement slab 56 which measures 12 x 40 x 1 inches. The parts for carrying the test deck are also made of iron. An iron bar 67, 12 x 1 x ¼ inches is placed across the top edge of the deck to protect the sample at this point.

In front of the test deck is the burner 68 comprising an iron pipe having an inside diameter of .472 inch and an outside diameter of .675 inch, with 17 holes 0.078 inch in diameter and ½ inch apart disposed at an angle that is parallel with the plane of the test deck. The burner is provided with an inlet line 69 controlled by a shut-off valve 70. In the line 69 is an orifice 76, 5/64 inch in diameter, that is located in the housing connections 71. Between the valve 70 and the orifice is a manometer 72. By this arrangement, a supply of gas under constant pressure can be obtained, thereby obtaining a steady flame of constant intensity during the test.

At the base of the test deck and between the burner and the deck holder is placed a pan 74, ¾ x 1 x 10 inches, which collects any bituminous coating material that flows from the sample during the exposure to the flame. This pan is provided with a removable cover 75.

The dimensions of the different parts of the testing apparatus shown in the drawing as used by us are as follows:

| | Inches | | Inches |
|---|---|---|---|
| a | 24 | o | 8 |
| b | 38 | p | 2 |
| b' | 6 | q | ¾ |
| c | 18½ | r | 1 |
| d | 72 | s | 12 |
| e | 16½ | t | .7 |
| f | 10 | u | 10½ |
| g | 12¼ | v | 12 |
| h | 38 | w | 12 |
| i | 64 | x | 1 |
| j | 32 | y | 12 |
| k | 24 | y' | 1 |
| l | 24 | z | 6 |
| m | 40 | aa | 12 |
| n | 27 | bb | 1 |

In carrying out the test, the apparatus is first assembled and the burner is lighted so as to provide a pilot flame that is about ½ inch in length when the fan is operating. The windows 53 and 54 are then closed and the room in which the apparatus is placed is arranged so that there will be relatively constant conditions during the test. The temperature and relative humidity of the room should be approximately 80° F. and 40%, respectively. The fan should generate a wind velocity of about 150 to 155 feet per minute at the portion of the deck exposed to the flame. The valve 70 is then opened until a flame about 8 to 9 inches long is produced having a temperature of about 1325 to 1370° F. When the valve 70 is opened to produce such flame, a timing device is started. After the sample has been exposed to the flame for a period of five minutes the flame is turned off and simultaneously the cover 75 is placed over the top of pan 74 so as to prevent any further bituminous composition that may flow down the test deck from collecting in the pan. Before the commencement of the test the pan 74 is carefully weighed and at the conclusion of the test is again weighed, the difference in weight being the number of grams of bituminous coating material that has flowed into the pan. Before making the test the weight of the bituminous coating on the test sample is determined by weighing the base sheet material before the bituminous coating is applied thereto and weighing the complete sample, the difference being the weight of the coating.

The coefficient of flow resistance is computed according to the following expression:

$$100 - \frac{\text{weight in grams of coating collected in pan} \times 100}{\text{total weight in grams of coating prior to test}}$$

For example, if the weight of the bituminous coating on the sample was 1000 grams prior to testing and 50 grams of the coating were collected in the pan during the test the coefficient of flow resistance would be $$100 - \frac{50}{1000} \times 100 = 95$$

If no coating composition flows into the pan then the flow resistance coefficient is 100 which is the maximum attainable.

The flow resistance coefficient is primarily a function of the filler contained in the bituminous composition since the greatly increased flow resistance of the coating, if attained, is due to presence of the filler in an amount that equals or exceeds the critical amount for the filler undergoing test. It may be mentioned, however, that the amount of a given filler that is critical will usually vary somewhat depending upon the bitumen that is used in the bituminous composition. Thus the critical amount of filler for a socalled "cracked asphalt," namely, oxidized asphaltic cracking still residue, is usually somewhat less than for a straight run asphalt residue. Also the critical amount of filler is usually somewhat greater for an asphaltic material of relatively low softening point, e. g., about 165° F. as compared with an asphalt having a higher softening point, e. g. about 240° F.

According to this invention the special fire-resistant bituminous paint composition can be formulated so that the paint base layer that remains after evaporation of volatile solvent will have a flow resistance coefficient as high as 100. However, greatly improved fire resistance is obtained according to this invention when the flow resistance coefficient of the paint base is 75 or greater, although it is preferable that the flow resistance coefficient of the paint base be 95 or above.

As aforesaid, the different screen gradings of a fibrous mineral such as asbestos dust differ considerably in their effectiveness in imparting flow resistance to a bituminous paint base. Thus in the case of Chrysotile asbestos we have found that when the screen grading (—28+35) is used, a composition consisting of 10% by weight of such specially graded fiber, 45% by weight of slate flour (total 55% filler) and 45% by weight of asphalt having a softening point of about 220° F. has a flow resistance coefficient of about 75. The screen grading (—6+8) is seen to be considerably more effective since a flow resistance coefficient of 75 can be achieved by using only about 2.5% by weight of mineral fiber together with 52.5% by weight of slate flour (total filler 55%) and 45% by weight of the same asphalt. In other words, using the same total amount of filler consisting of mineral fiber plus a diluent filler that has little flow resistance effectiveness in amounts less than 55% by weight, the coarser fraction (—6+8) is much more effective than the fraction (—28+35) in affording a given degree of flow resistance. On the other hand if asbestos fiber (—200) is used it requires substantially the entire 55% of filler to achieve a flow resistance coefficient of 75. In view of the differences in effectiveness of the different screen gradings of a mineral fiber such as asbestos we have, in order to indicate more definitely the amount of mineral fiber of given screen grading or combination of screen gradings that is required in a suitable paint base, assigned to the different screen gradings what we have called a "screen factor" for each of the different gradings. Thus if the screen grading (—28+35) is taken as having a screen factor of unity, any screen grading that only requires half the amount as compared with the grading (—28+35) will be twice as effective and will have a screen factor of 2. On the other hand a screen grading which requires twice the amount as compared with the grading (—28+35) will have a screen grading of 0.5. In like manner screen factors can be assigned to the other screen gradings.

The above described test for determining the flow resistance coefficient of a filler in a bituminous composition affords a convenient bases for setting up the screen factors of the screen gradings of fibrous mineral fillers on a definite scale and when the screen factor of a given screen fraction of a fibrous mineral is referred to herein, the screen factor as determined in the following manner is intended. The test for determining the flow resistance coefficient is carried out using the test apparatus and procedure above described. The total filler in all cases is 55% by weight of the bituminous composition and the asphalt used in all cases is a straight run asphalt, air blown (oxidized) to a softening point of about 220° F. Slate flour at least about 85% of which passes a 200 mesh sieve is used in all cases as the standard diluent filler, and the amount by weight of a particular screen grading of fibrous mineral to achieve a flow resistance coefficient of substantially 75 is determined. Each sample is prepared on the asphalt saturated asbestos felt specified hereinabove. As a standard, Chrysotile asbestos dust of the grading (—28+35) is taken as having a screen factor of unity and the factor for each of the other gradings is calculated to this standard. By way of concrete example, it being the case that substantially 10% by weight of the bituminous composition of Chrysotile asbestos having screen grading (—28+35) (the total filler being 55% as aforesaid); is required to afford a flow resistance coefficient of substantially 75 and it also being the case that about 2.5% by weight of the bituminous composition of Chrysotile asbestos dust having the screen grading (—6+8) (the total filler being 55%) also affords a flow resistance coefficient of about 75, the screen factor of Chrysotile asbestos dust having the screen grading (—6+8) is seen to be about 4. By way of further illustration, the "screen factors" of the different screen gradings of a typical Chrysotile asbestos dust on the basis above mentioned are as follows:

| Screen grading | Screen factor |
|---|---|
| −6+8 | 4.0 |
| −8+10 | 3.4 |
| −10+14 | 2.5 |
| −14+20 | 1.8 |
| −20+28 | 1.4 |
| −28+35 | 1.0 |
| −35+48 | .7 |
| −48+65 | .5 |
| −65+100 | .4 |
| −100+150 | .3 |
| −150+200 | .2 |
| −200 | .2 |

It is to be noted that the fibers of the grading (−200) require substantially the entire 55% of total filler to provide a flow resistance coefficient of about 75. Any different type of fiber of a particular grading which would require substantially or more than 55% by weight to afford a flow resistance coefficient of about 75 may be considered as having a screen factor of 0.2.

The foregoing affords a convenient way of ascertaining the flow resistant effectiveness of a fibrous mineral filler. Given the percentage by weight of each of the screen gradings of mineral fiber contained in the bituminous paint base, this percentage by weight of each multiplied by the screen factor for each of the screen gradings gives what we term the "grading index" for each of the screen gradings, and by adding the grading indices of each screen grading together the grading index for the total mineral fiber content is readily determined. By way of illustration the grading index of the mineral fiber component of the above mentioned typical embodiment of this invention is as follows:

| Screen grading | Percent by weight of paint base | Screen factor | Grading index |
|---|---|---|---|
| −6+8 | .1 × | 4.0 | .4 |
| −8+10 | .4 × | 3.4 | 1.4 |
| −10+14 | 2.5 × | 2.5 | 6.2 |
| −14+20 | 4.5 × | 1.8 | 8.1 |
| −20+28 | 3.0 × | 1.4 | 4.2 |
| −28+35 | 4.5 × | 1.0 | 4.5 |
| −35+48 | 1.0 × | .7 | .7 |
| −48+65 | 1.0 × | .5 | .5 |
| −65+100 | 1.0 × | .4 | .4 |
| −100+150 | 3.0 × | .3 | .9 |
| −150+200 | 4.0 × | .2 | .8 |
| −200 | 10.0 × | .2 | 2.0 |
| Total grading index for mineral fiber | | | 30.1 |

It is apparent that in the formulation of a bituminous paint base for a bituminous paint composition one can, from the screen analysis of a mineral fiber, determine the grading index of the mineral fiber employed and thereby determine the effectiveness of the mineral fiber in the amount used in stabilizing against flow at flame temperature the bitumen in the paint composition. We have found that for bituminous paint compositions the grading index of the mineral fiber should be at least about 10 and preferably at least about 15 when the paint base contains about 45% of bitumen. When the paint base contains only about 25% by weight of bitumen then the grading index of the mineral fiber should be at least about 6 and preferably at least about 8. For total bitumen content of the paint base between 25% and 45% by weight (with corresponding filler content from 75% to 55%) the minimum grading index varies proportionally from about 6 to about 10 and in preferred practice varies from about 8 to about 15. Or, expressed in another way, the ratio of grading index of the mineral fiber to percent by weight of the bitumen in the composition should be at least 1 to 5 and preferably should be at least 1 to 3.

When reference is made herein to "screen factor" and "grading index," the reference is made to these values when determined under the specific conditions above specified. When, however, reference is made to the flow resistance coefficient of the filler material in a bituminous composition or paint base, the reference is to the flow resistance coefficient of the entire filler content of the composition whatever the amount may be and whatever the character of the bitumen used in the composition may be, the composition being applied, however, to the impregnated asbestos felt sheet material that has been specified hereinabove.

In determining the screen fractions or gradings of fibrous or other mineral filler that are referred to herein, 8 inch diameter testing sieves of the W. S. Tyler Company sieve series, meeting A. S. T. M. Standard E 11-39 for sieves for testing purposes have been used. A quantity of filler to be screen ranging from 200 to 300 grams is placed in the uppermost of a series of testing sieves and subjected to suitable agitation as in a standard W. S. Tyler Company Ro-Top sieve shaking machine for a period of five minutes in order to separate the original filler roughly into fractions retained in the different testing sieves. This operation is repeated if necessary in order to obtain about 100 to 200 grams of the desired screen fraction, which fraction is then individually re-screened for 15 minutes using the Ro-Top sieve shaking machine or its equivalent in order to remove any fines contained therein. The resulting sieve fraction is material that has passed the coarser screen and is retained on the finer screen.

In the foregoing typical example of the practice of the invention, the filler which passes a 100 mesh sieve, namely the Kaolinitic clay and the asbestos dust passing a 100 mesh sieve, constitutes about 47% by weight of the paint base while the asbestos fiber retained on a 100 mesh testing sieve constitutes about 18% by weight of the paint base. The mineral filler content of the paint base should contain a substantial amount of finely-divided mineral which passes a 100 mesh testing sieve both from the point of view of affording improved fire resistance and from the point of view of providing a paint composition that can be readily applied with a brush. The proportion of fine mineral filler that is desirable in the paint base is different for different total filler contents. Thus when the total mineral filler content of the paint base is around 55% it is desirable to have present in the paint base at least 25% by weight of the paint base of finely-divided mineral, either fibrous or non-fibrous, that passes a 100 mesh testing sieve, and it is preferable that there should be included in a paint base containing 55% total filler at least about 35% by weight of the weight of the paint base of such finely-divided mineral filler. When the total filler content of the paint base is around 75% by weight then it is desirable that the mineral filler which passes a 100 mesh testing sieve constitute at least about 50% by weight of the paint base and preferably about 55% by weight of the paint base. For total filler contents between 55% and 75% by weight of the paint base, the minimum limits for the finely-divided mineral filler which passes a 100 mesh testing sieve should vary proportionally between the limits that have been mentioned above as desirable and as preferable.

On the other hand, it is desirable to have at least 5% of fibrous mineral fiber passing a 6 mesh testing sieve and retained on a 35 mesh testing sieve contained in the bituminous paint base and it is preferable to include at least 10% by weight of such fiber in the paint base, but it is ordinarily desirable to use mineral fiber of such amount and length that the ratio of the grading index of the fibrous mineral to the percent by weight of bitumen in the paint base not be substantially greater than 1 to .7 and preferably not greater than 1 to 1.

The bitumen in the bituminous paint composition is of the range 25% to 45% by weight of the paint base, the filler constituting 55% to 75% of the paint base. Preferably the mineral filler constitutes about 60% to 70% of the paint base. The softening point of the bitumen may be quite widely varied since the bitumen in the paint composition is stabilized by the filler material regardless of the softening point. Ordinarily the softening point of the bitumen will vary from about 150° F. to about 275° F. and for most purposes a softening point range of 180° F. to 220° F. for the bitumen in the paint composition is preferable. The softening points referred to are determined by the standard Ring and Ball softening point test. For most purposes asphalts derived by the refining of Mid-continent crudes are desirable, although asphalts from Mexican, Venezuelan and Colombian crudes also are suitable. Moreover, other bitumens such as pitches, coal tar and the like may also be used in the practice of this invention. While cracked asphalts tend to provide a somewhat higher flow resistance coefficient than other asphaltic materials, cracked asphalts do not have as long weathering life and for weather exposure it is usually desirable to employ asphaltic materials other than cracked asphalts. If desired a natural bitumen such as gilsonite can be employed.

In the practice of this invention it is preferable to employ asbestiform mineral fiber as the mineral fiber having a grading index of the order above mentioned. Such asbestiform fibrous mineral includes mineral fibers such as Chrysotile asbestos, Canadian picrolite, amosite, anthophyllite, tremolite and actinolite. Of these asbestiform mineral fibers Chrysotile asbestos fiber is regarded as preferable due to the physical properties of the fibers and due to the fact that Chrysotile asbestos contains about 12% to 15% of water of constitution which is liberatable at or below flame temperatures. Canadian picrolite also contains a similar amount of water of constitution. Other filler materials which include water of constitution liberatable at or below flame temperatures are kaolinitic clays, disintegrated serpentine rock, hydrated Portland cement, and calcium silicate hydrate, each of which contains about 10% or more of water of constitution that is liberatable at or below flame temperatures. It is desirable that the filler material in the paint base comprise filler material which contains water of constitution that is liberatable at or below flame temperature and that amounts to at least 5% by weight of the paint base so that when the paint base is exposed to flame temperature the water of constitution in the filler will be liberated in vapor form and will develop pores in the paint base and thereby augment its heat insulating effectiveness. If all of the filler were Chrysotile asbestos or other filler containing about 15% by weight of water of constitution, the water of constitution contained in the filler would constitute about 11% by weight of the paint base when the filler content is 75% by weight of the paint base.

Another fibrous material that is suitable for use as the stabilizing material in the paint composition is a comminuted mixture of hydrated Portland cement and asbestiform mineral fiber, the hydrated Portland cement having become set with the asbestos fiber distributed therethrough. A convenient source of such material is asbestos-cement roofing scrap. Asbestos-cement roofing scrap usually contains about 20% to 35% by weight of asbestos fiber and about 65% to 80% by weight of hydrated Portland cement. Heretofore such scrap has been regarded as an unavoidable waste of no commercial value. However, by subjecting the scrap to a disintegrator, such as a hammer mill, until the particle size is of the order mentioned in connection with asbestos fibers, the resulting mass contains a multiplicity of short asbestos fibers to which the hydrated Portland cement adheres as nodules and for this reason this material is essentially a fibrous material and is to be regarded as a finely-divided fibrous mineral filler.

Another material which is somewhat similar to asbestos cement in that the material contains mineral fibers together with non-fibrous material, is disintegrated fiber-bearing serpentine rock. Since disintegrated fiber-bearing serpentine rock contains fibrous particles, such disintegrated serpentine rock is regarded as one form of fibrous mineral which is suitable for use in practicing this invention. However, depending upon the physical structure and fibrous mineral content of the particular serpentine rock that is used, the proportion of fiber contained therein is subject to some variation, but, as pointed out below, this merely has the effect of varying somewhat the screen factors of the various screen gradings of the disintegrated serpentine rock as calculated to Chrysotile asbestos dust of the screen grading (—28+35) which has a screen factor of unity. Moreover, disintegrated fiber-bearing serpentine rock is of such character that in order to liberate the fibrous material contained therein it should pass a 20 mesh testing sieve, and, when reference is made herein to disintegrated fiber-bearing serpentine rock, only that serpentine rock which has been disintegrated so that it passes a 20 mesh testing sieve is intended, since the individual particles of coarser gradings are not fibrous in character but granular (are not fibrous mineral as this term is used herein) and since such coarser gradings are ineffective in producing highly fire-resistant paint compositions.

Other mineral fibers may likewise be employed, such as mineral wool and glass fibers. The term "mineral wool" includes various products obtained by attenuating into fibrous form suitable fused mineral materials such as rock or slag.

With regard to the fibrous mineral materials other than asbestiform mineral fibers, it is not necessarily the case that a particular screen grade of, for example, asbestos-cement or mineral wool, will have the same screen factor as that of Chrysotile asbestos fiber. In fact even as between different types of asbestiform mineral fiber there are some variations in this regard. However, utilizing Chrysotile asbestos fiber of the screen grading (—28+35) as the standard, with a screen factor of 1.0, the screen factor of the screen gradings of the different fibrous materials is determinable in the same way that the screen factor of each of the various screen gradings of Chrysotile asbestos fiber is determinable as was described hereinabove. Such mineral fibers therefore should be used in such gradings and amounts as to provide the requisite minimum grading index that has been mentioned above. Moreover, the screen factor for the screen gradings of mixtures of fibrous minerals are determinable in a similar manner, calculated to Chrysotile asbestos dust of the screen grading (—28+35) which has a screen factor of unity. When a mixture of fibrous minerals is employed it is desirable that all or at least a major proportion of the fibrous mineral be selected from the group consisting of asbestiform mineral fiber, disintegrated asbestos-cement, and disintegrated fiber-bearing serpentine rock.

If other filler is contained in paint base of the bituminous paint composition in addition to fibrous mineral, such filler may be selected from any suitable finely-divided solid water-insoluble heat-resistant mineral filler. Thus slate flour, limestone dust, kaolinitic clay, talc, silica flour, dead-burned calcium sulphate, fly ash, hydrated Portland cement and the like may be employed. By "heat resistant" any material which is sufficiently heat resistant so that it will retain structural integrity when subject to flame temperature while incorporated in the bituminous paint base is intended. In this connection substances such as Chrysotile asbestos, hydrated Portland cement, etc. are regarded as heat resistant even though they contain water of constitution which may be driven off at temperatures at or below flame temperature.

It is ordinarily desirable that the special bituminous paint composition be formulated so that it will not contain any undue amount of fibers or other particles that are retained on a 6 mesh testing sieve. Thus asbestos such as that generally referred to as "fiber" according to the classification of the Quebec Asbestos Producers Association and of the types which are in general commercial use is undesirable for use in bituminous paint compositions according to this invention. Such long fibers tend to become entangled in clots or clumps that do not spread out on the surface to which the paint is to be applied and that tend to be pushed ahead of the brush, thereby wiping the fibers as well as the other filler material along the surface, leaving portions of the surface coated merely with the asphalt. Any such effect is undesirable both from the point of view of weather resistance and from the point of view of fire resistance. For these reasons it is usually desirable that less than 10% of the total fibrous mineral filler in the paint base consist of particles retained on a 6 mesh testing sieve. The paint composition should be applicable to provide a coating or layer that is uniform both in consistency and in thickness. While fibrous mineral retained on a 6 mesh testing sieve is regarded as undesirable for inclusion in the paint base, any small amount of such coarse fiber that is retained on a 6 mesh testing sieve is to be regarded as having the same screen factor as the screen grading (—6+8) of the fibrous mineral in question.

The bituminous paint composition of this invention, as is apparent from the foregoing, is formulated within quite narrow limits whereby mineral fiber of requisite grading index is employed while at the same time providing a relatively high proportion of mineral filler of small particle size which may be non-fibrous or may be fibrous but have a low screen factor. Thus, for example, if the paint base contains about 65% by weight total filler and if the asbestos fiber that is used is confined to the screen grading (—28+35), the paint base must contain at least 8% of such fiber in order that the mineral fiber in the paint base may have a grading index of at least 8. Moreover, the finely-divided filler which passes a 100 mesh testing sieve must amount to at least 45% by weight of the paint base. This leaves only about 12% of the composition for possible variation in the filler content, and indicates the close limits within which the paint composition must be formulated and the criticality of these limits.

When reference is made herein to "bitumen," this term is used in reference to asphalt, pitch, tar, and the like, by itself and unmixed with filler. When, on the other hand, reference is made herein to a bituminous composition or bituminous material, reference is made to a composition or material comprising bitumen and with or without a filler. Any modifier for the bitumen, e. g., of a resinous or oily character, that may be included in the paint base is to be regarded as part of the bitumen content of the paint base.

While this invention has been described in connection with certain illustrative embodiments thereof, it is to be understood that this has been done for the purpose of exemplification. Accordingly the scope of this invention is to be governed by the language of the following claims construed in the light of the foregoing description of this invention.

We claim:

1. A solvent-thinned bituminous paint composition which is adapted for application to produce a fire-resistant bituminous coating and which comprises non-volatile constituents including bitumen, said non-volatile constituents constituting the paint base, and a volatile solvent for the bitumen in said paint base that thins the paint base to brushable consistency, said paint base comprising about 25% to about 45% by weight of said bitumen having a softening point of the range 150° F. to 275° F. and about 55% to about 75% by weight of finely-divided solid water-insoluble heat resistant mineral filler, said filler comprising fibrous mineral which passes a 6 mesh testing sieve and is retained on a 200 mesh testing sieve and the grading index of which has a ratio to the percent by weight of the bitumen in the paint base of at least 1 to 5, the ratio of the grading index of the fibrous mineral in said paint base to the percent. by weight of the bitumen in said paint base being not greater than about 1 to 1, and said finely-divided solid water insoluble heat-resistant mineral filler comprising material passing a 100 mesh testing sieve which is any of the constituent particles passing a 100 mesh testing sieve comprised in the total filler and which constitutes in said paint base at least 25% to at least 50% by weight of said paint base proportionally for total filler contents ranging from 55% to 75% by weight of the paint base.

2. A solvent-thinned bituminous paint composition according to claim 1 wherein the filler in said paint base comprises at least 5% by weight of said paint base of mineral fiber which passes a 6 mesh testing sieve and is retained on a 35 mesh testing sieve.

3. A solvent-thinned bituminous paint composition which is adapted for application to produce a fire-resistant bituminous coating which comprises non-volatile constituents including bitumen, said non-volatile constituents constituting the paint base, and a volatile solvent for said bitumen constituting from about 25% to about 65% by weight of said composition, said paint base comprising about 25% to about 45% by weight of said bitumen having a softening point of the range 150° F. to 275° F. and about 55% to about 75% by weight of finely-divided solid water-insoluble heat resistant mineral filler, said filler comprising asbestiform mineral fiber having a minimum grading index of about 6 to about 10 proportionally for total bitumen contents of the paint base ranging from 25% to 45% and the ratio of the grading index of the fibrous mineral in said paint base to the per cent. by weight of the bitumen in said paint base being not greater than about 1 to 0.7, and said finely-divided solid water-insoluble heat-resistant mineral filler comprising material passing a 100 mesh testing sieve which is any of the constituent particles passing a 100 mesh testing sieve comprised in the total filler and which constitutes in said paint base at least 25% to at least 50% by weight of said paint base proportionally for total filler contents ranging from 55% to 75% by weight of the paint base, and the finely-divided solid water-insoluble heat-resistant fibrous mineral filler contained in said paint base comprising less than 10% by weight of particles retained on a 6 mesh testing sieve.

4. A solvent-thinned bituminous paint composition which is adapted for application to produce a fire-resistant bituminous coating and which comprises non-volatile constituents including bitumen, said non-volatile constituents constituting the paint base, and a volatile solvent for said bitumen constituting from about 25% to about 65% by weight of said composition, said paint base comprising about 25% to about 45% by weight of said bitumen having a softening point of the range 150° F. to 275° F. and about 55% to about 75% by weight of finely-divided solid water-insoluble heat-resistant mineral filler, said filler comprising fibrous mineral which passes a 6 mesh testing sieve and which has a minimum grading index of the range 6 to 10 proportionally for total bitumen contents of said paint base ranging from 25% to 45% by weight, the ratio of the grading index of the fibrous mineral in said paint base to the percent. by weight of the bitumen in said paint base being not greater than 1 to 1, said filler comprising material passing a 100 mesh testing sieve which is any of the constituent particles passing a 100 mesh testing sieve comprised in the total filler and which constitutes in said paint base at least 25% to at least 50% by weight of said paint base proportionally for total filler contents ranging from 55% to 75%, said finely-divided solid water-insoluble heat-resistant fibrous mineral filler comprising less than 10% by weight of particles retained on a 6 mesh testing sieve, and the total filler in said paint base including said fibrous mineral having a flow resistance coefficient of at least 75 when said paint base of said paint composition is exposed to flame temperature under the flow resistance test defined herein.

5. A solvent-thinned bituminous paint composition according to claim 4 wherein said fibrous mineral is asbestiform mineral fiber and wherein at least 5% by weight of said paint base consists of asbestiform mineral fiber passing a 6 mesh testing sieve and retained on a 35 mesh testing sieve.

6. A solvent-thinned bituminous paint composition according to claim 4 wherein said finely-divided water-insoluble heat resistant mineral filler comprises mineral filler containing water of constitution that constitutes from about 5% to about 11% by weight of said paint base.

7. A solvent-thinned bituminous paint composition which is adapted for application to produce a fire-resistant bituminous coating and which comprises non-volatile constituents including bitumen, said non-volatile constituents constituting the paint base, and a volatile solvent for said bitumen constituting from about 25% to about 65% by weight of said composition, said paint base comprising about 30% to about 40% by weight of said bitumen having a softening point of the order of 180° F. to 220° F. and about 60% to about 70% by weight of finely-divided solid water-insoluble heat-resistant mineral filler, said filler comprising asbestiform mineral fiber which passes a 6 mesh testing sieve and which has a minimum grading index of the range 10 to 13 proportionally for total bitumen contents of the paint base ranging from 30% to 40% by weight, the ratio of the grading index of the fibrous mineral in said paint base to the per cent. by weight of the bitumen in said paint base being not greater than 1 to 1, the said finely-divided solid water-insoluble heat resistant filler comprising material passing a 100 mesh testing sieve which is any of the constituent particles passing a 100 mesh testing sieve comprised in the total filler and which constitutes in said paint base at least 27% to 46.5% by weight of said paint base proportionally for total filler contents ranging from 60% to 70%, the finely-divided solid water-insoluble heat-resistant fibrous mineral filler contained in the paint base comprising less than 10% by weight of particles retained on a 6 mesh testing sieve, and said filler including said mineral fiber in said composition having a flow resistant coefficient of at least 95 when said paint base of said paint composition is exposed to flame temperature under the flow resistance test defined herein.

GEORGE ARTHUR FASOLD.
HAROLD W. GREIDER.